United States Patent
Henderson et al.

(10) Patent No.: US 10,942,971 B2
(45) Date of Patent: Mar. 9, 2021

(54) INSERTING ELEMENTS INTO ARTIFICIAL INTELLIGENCE CONTENT

(71) Applicant: NewsRx, LLC, Atlanta, GA (US)

(72) Inventors: Charles W. Henderson, Atlanta, GA (US); Alan D. Henderson, Watkinsville, GA (US); Chantay P. Jones, Marietta, GA (US); Kalani K. Rosell, New Haven, CT (US)

(73) Assignee: NewsRx, LLC, Atlanta, GA (US)

( * ) Notice: Subject to any disclaimer, the term of this patent is extended or adjusted under 35 U.S.C. 154(b) by 188 days.

(21) Appl. No.: 15/294,270

(22) Filed: Oct. 14, 2016

(65) Prior Publication Data
US 2018/0107929 A1   Apr. 19, 2018

(51) Int. Cl.
| G06T 19/00 | (2011.01) |
| G06F 17/00 | (2019.01) |
| G06Q 30/02 | (2012.01) |
| G06F 3/048 | (2013.01) |
| G06F 11/30 | (2006.01) |
| G06F 16/903 | (2019.01) |
| G06Q 40/00 | (2012.01) |
| G06N 5/02 | (2006.01) |
| G06F 16/9032 | (2019.01) |
| G06F 16/332 | (2019.01) |

(52) U.S. Cl.
CPC .... *G06F 16/90335* (2019.01); *G06F 16/3329* (2019.01); *G06F 16/90332* (2019.01); *G06N 5/022* (2013.01); *G06Q 40/00* (2013.01)

(58) Field of Classification Search
CPC ... G06F 16/90335; G06N 5/022; G06Q 40/00
USPC .................................................... 706/15–44
See application file for complete search history.

(56) References Cited

U.S. PATENT DOCUMENTS

| 7,146,616 | B2* | 12/2006 | Dorner | G06F 9/547 719/318 |
| 2006/0069589 | A1* | 3/2006 | Nigam | G06F 17/274 706/55 |
| 2007/0180019 | A1* | 8/2007 | Woods | G06F 16/954 709/203 |
| 2007/0180020 | A1* | 8/2007 | Woods | G06F 9/4443 709/203 |
| 2007/0192143 | A1* | 8/2007 | Krishnan | G06Q 10/10 705/3 |
| 2009/0037223 | A1* | 2/2009 | Green | G06Q 50/22 705/3 |
| 2009/0271390 | A1* | 10/2009 | Zheng | G06F 16/90324 |
| 2010/0070448 | A1* | 3/2010 | Omoigui | H01L 27/1463 706/47 |
| 2011/0016121 | A1* | 1/2011 | Sambrani | G06Q 30/02 707/734 |
| 2012/0151329 | A1* | 6/2012 | Cordasco | G06F 11/3006 715/234 |
| 2012/0296974 | A1* | 11/2012 | Tabe | G06Q 10/06 709/204 |

(Continued)

*Primary Examiner* — Brandon S Cole
(74) *Attorney, Agent, or Firm* — Lee & Hayes, P.C.

(57) ABSTRACT

Technologies are described herein for injecting elements into artificial intelligence content. According to some examples, content generated from an artificial intelligence source is received, facts are determined from the content, and terms are selected for use based on the facts. The terms are used to modify or are added to the content to generate modified artificial intelligence content.

17 Claims, 6 Drawing Sheets

(56) References Cited

U.S. PATENT DOCUMENTS

| | | | |
|---|---|---|---|
| 2014/0281850 A1* | 9/2014 | Prakash | G06F 40/117 715/202 |
| 2015/0312184 A1* | 10/2015 | Langholz | H04L 51/02 715/753 |
| 2015/0371257 A1* | 12/2015 | Peters | G06Q 30/0244 705/14.43 |
| 2016/0255139 A1* | 9/2016 | Rathod | G06F 16/9535 709/203 |
| 2017/0046127 A1* | 2/2017 | Fletcher | G06F 7/10 |
| 2017/0251049 A1* | 8/2017 | Wang | H04L 67/10 |
| 2018/0307748 A1* | 10/2018 | Freilinger | G06F 17/16 |

* cited by examiner

INSERTING ELEMENTS INTO ARTIFICIAL INTELLIGENCE CONTENT

BACKGROUND

Content provided by artificial intelligence sources is becoming more prevalent. From reports generated by financial information to news created from current events, content generated by an artificial intelligent source is increasingly being relied on by various businesses to provide content.

It is with respect to these and other considerations that the disclosure made herein is presented.

SUMMARY

Technologies are described herein for injecting elements into artificial intelligence content. Generally described, a system receives content from an artificial intelligence source. Content can be information such as text from web pages, video, documents, speech or aural input, and the like. In some examples, input from non-text artificial intelligence sources can be translated to text using various speech-to-text translator technologies. The system determines one or more data stores relevant to at least one fact identified in the content. The system accesses the relevant data store to determine data associated with the identified fact. Content associated with the determined data is injected into the artificial intelligence content.

As used herein, "artificial intelligence" content is content constructed, written, or otherwise created by an artificial intelligence source. "Artificial intelligence" is broadly defined to be a computing source configured to operate fully or partially autonomously to generate content. It should be appreciated that the above-described subject matter can be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
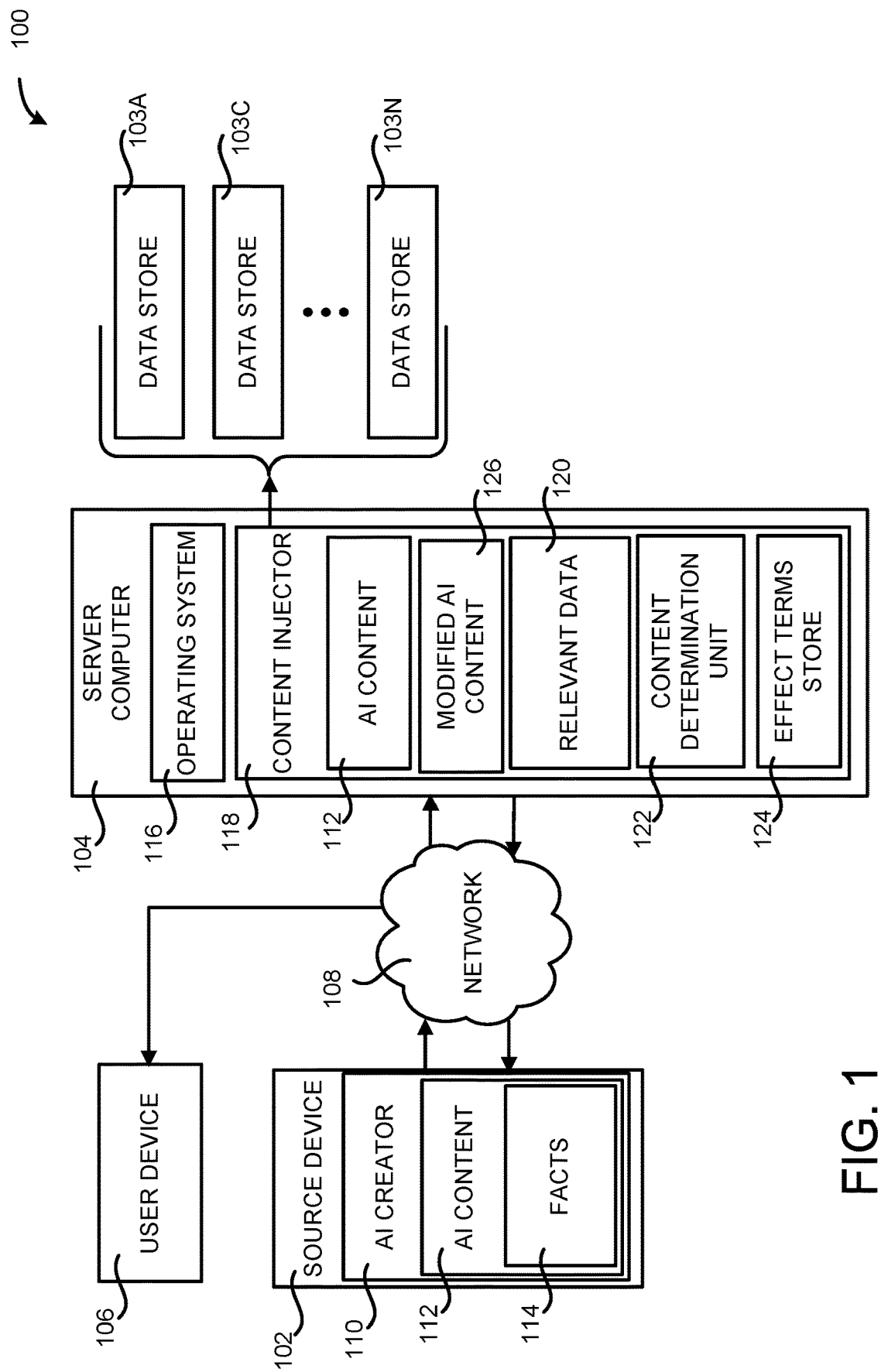
FIG. 1 is a system diagram illustrating an artificial intelligence content detection system.

The following detailed description is directed to technologies for injecting elements into content generated by an artificial intelligence source. When generating content, artificial intelligence sources typically intake facts and apply various pre-selected verbiage based on the fact. The verbiage is typically designed to make the article (or other content) appear more "human." For example, content generated for a baseball game may include words typically used by announcers or sports fans. However, this type of artificial intelligence content, though created to mimic human output, can be deemed a superficial or "thin" output. In other words, the content provides little else other than the facts, surrounded by human-like words and phrases.

The presently disclosed subject matter provides technologies that inject, or modify previously existing, content to provide a reader with an increased amount of information. Take for example two car wrecks occurring in two different places. Both car wrecks occur on a main road in their respective cities and involved one other car. All aspects of the wreck were the same other than the location in which they occurred.

A car wreck that occurs on the main street in a 100-person town could have a different effect (or impact) than a car wreck occurring in Times Square, New York City. Whereas the wreck in the small town might have a small impact, the wreck in New York City could impact hundreds, if not thousands, of lives, have a financial impact, and have a serious impact on the delivery of emergency services in the city. Using the same artificial intelligence technology provided currently, the content generated from both of these incidents could, and likely would, have the same "look and feel." In both instances, the facts are the same. Thus, words used by the artificial intelligence content source to emulate human patterns may choose identical or similar words or phrases to generate content for the two wrecks.

Various examples of the presently disclosed subject matter receives content from artificial intelligence sources. The content is analyzed to determine one or more data stores (or other sources of information) that are relevant to facts extracted from the content. Continuing with the example above, examples of the presently disclosed subject matter receives the content from the two wrecks, extracts facts in the content, and determines one or more data stores relevant to the facts. In the example provided, a relevant data store could be the population, the number of cars using the road, financial data associated with the area (e.g. wealth), and the like.

Once the data stores relevant to the extracted facts are identified, data associated with the facts are extracted. For example, the actual number of people from the population data store is determined. Once the data associated with the extracted facts are determined, one or more words or phrases are selected to connote the data associated with the extracted facts.

For example, a relevant data store could have data relating to the number of people near an event. If the number of people is relatively small, then the words selected to describe the event can be words that do not connote a sense of urgency, danger, or other serious matter, as the number of people impacted may be relatively small. However, if the number of people near an event is relatively large, words selected to describe an event can connote a sense of danger, urgency, high impact, and the like.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific examples. Referring now to the drawings, aspects of technologies for injecting elements into artificial intelligent content will be presented.

Referring now to FIG. 1, aspects of an injection system 100 for injecting elements into content generated by an artificial intelligence source are described. The injection system 100 shown in FIG. 1 includes a source device 102, a server computer 104 and a user device 106. In some examples, the source device 102 generates artificial intelligence content, which is transmitted to the server computer 104 through a network 108. The server computer 104 injects elements into the content for delivery to the user device 106, explained in more detail below.

According to various configurations, the functionality of the source device 102, server computer 104, or the user device 106 can be provided by a personal computer ("PC") such as a desktop, tablet, or laptop computer system. In some other configurations, the functionality of the source device 102, server computer 104, or the user device 106 can be provided by other types of computing systems including, but not limited to, a handheld computer, a netbook computer, an embedded computer system, a mobile telephone, a smart phone, or another computing device.

Various aspects of the source device 102, server computer 104, or the user device 106 are illustrated and described below. Although the functionality of the source device 102, server computer 104, or the user device 106 is primarily described herein as being provided by a tablet or slate computing device, a smartphone, or a PC having a touch-sensitive display, because the functionality described herein with respect to the source device 102, server computer 104, or the user device 106 can be provided by additional and/or alternative devices, it should be understood that these examples are illustrative, and should not be construed as being limiting in any way.

The source device 102 is configured to provide functionality for an artificial intelligence (AI) content creator 110. The AI content creator receives information from various sources and generates AI content 112 using various technologies. The presently disclosed subject matter is not limited to any particular technology for creating the AI content 112, as various technologies may be used.

The AI content 112 includes facts 114. The facts 114 are information upon which the AI creator 110 generates the AI content 112. For example, the facts 114 can include baseball scores for an article about a baseball game, stock price changes for an article about a particular company, and the like. It should be understood that the use of "facts" does not mean that the presently disclosed subject matter is limited to any particular type of information, as the use of the term is for convenience only. For example, an opinion may be used as a fact in the AI content 112. Further, the facts 114 can be derived from another source or may be generated by the AI creator 110.

The source device 102 is in communication with the server computer 104 through network 108. The server computer 104 is configured to provide functionality for injecting elements into content created by an artificial intelligence source, such as the AI creator 110 and the AI content 112. It should be understood, however, that various aspects of the presently disclosed subject matter can be performed wholly or partially on other devices, such as another server computer (not shown). The server computer 104 can be configured to execute an operating system 116. The operating system 110 is a computer program for controlling the operation of the server computer 104.

In some examples, the server computer executes the operating system 116 to execute the content injector 118. The content injector 118 receives the AI content 112 from the source device 102. The reason for receiving the AI content 112 may vary. The content injector 118 analyzes the AI content 112 to determine one or more facts contained in the AI content 112. As used herein, a "fact" includes information relevant to the narrative of the AI content 112. For example, a fact in an article about an accident can include the number of vehicles, location of the accident, and the like.

Once one or more facts from the AI content 112 have been determined, the content injector 118 accesses data stores 103A-103N (collectively referred to herein as "the data stores 103," and individually as "the data store 103A," "the data store 103B," and the like). The data stores 103 are information repositories that are accessible to the content injector 118. For example, the data store 103A can be a database with population information for a particular area. In another example, the data store 103B can be a data store with financial information.

The content injector 118 analyzes the data stores 103 and determines which data stores may have information relevant to the facts determined from the AI content 112. The relevancy can be determined using various technologies. For example, the content injector 118 may have access to a data store 103N that has stored therein statistical analysis of relevancy determined using a trial-and-error method and human learning. For example, one or more humans may have been provided a data set of terms, whereby the humans rate the terms as being relevant, not relevant, or on a scale of relevancy. Other technologies include the use of sparse Bayesian learning (including relevance vector machines). The presently disclosed subject matter is not limited to any particular technology of determining the relevance of the data stores 103 to the facts determined from the AI content 112.

After the relevant data stores 103 have been identified, the content injector 118 extracts relevant data 120 from the identified relevant data stores 103. The relevant data 120 is data that is pertinent to or applicable to the facts. For example, the relevant data 120 can be the population information near or around an accident. In another example, the relevant data 120 can be weather patterns. The relevant data 120 can be extracted from one or more than one of the data stores 103. The relevancy of the relevant data 120 can be determined using various technologies, included those described above.

The content injector 118 analyzes the relevant data 120 and the facts associated with the relevant data 120 by initiating a content determination unit 122. The content determination unit 122 is configured to determine an effect of the relevant data 120. As used herein, the "effect" is an emotional or physical importance to a reader (or viewer) of content that is modified. For example, the effect of a car accident in a city may be different for a reader of a news article describing the accident living in that city than for a reader of a news article describing the same accident living in a different country. In another example, the effect can be based on the impact to the population proximate to an event. For example, a five car accident in New York City would have a significant effect because of the population of New York City as well as its importance as a world-wide financial center.

After determining the effect of one or more facts, the content determination unit 122 accesses an effect terms store 124. The effect terms store 124 has stored therein a plurality of terms associated with particular effects. For example, an effect may be determined to be catastrophic based on the number of people proximate to an event (such as a car crash). In the original content generated by an artificial intelligence source, a car crash may be described as:

"Last night, two cars going in opposite directions collided head on."

While accurate, the "effect" of the car wreck is not expressed in the sentence generated by the artificial intelligence source. The sentence is essentially, purely factual. However, if the car wreck occurred in the middle of Times Square in New York City, the importance and significance of the event may need to be relayed in order to fully inform the reading public. Thus, the sentence above may be changed to (additions emphasized):

"Last night in a heavily populated area, a major accident occurred as two cars going in opposite directions collided head on."

While both sentences contain facts, the terms added reflect an effect determined by the content determination unit 122. Terms such as "major" and "heavily populated" may be terms associated with the relevant effects of an accident occurring in the middle of one of the most populated cities in the world. The terms stored in the effect terms store 124 may be stored in database, list, or other format whereby an effect is associated with one or more terms.

The content determination unit 122 selects the terms for addition or modification of previously inserted terms and provides the terms to the content injector 118. The content injector 118 receives the terms from the content determination unit 122 and modifies the AI content 112 into modified AI content 126 using the terms. The modified AI content 126 is provided to the user device 106 for consumption.

Figure 2A:
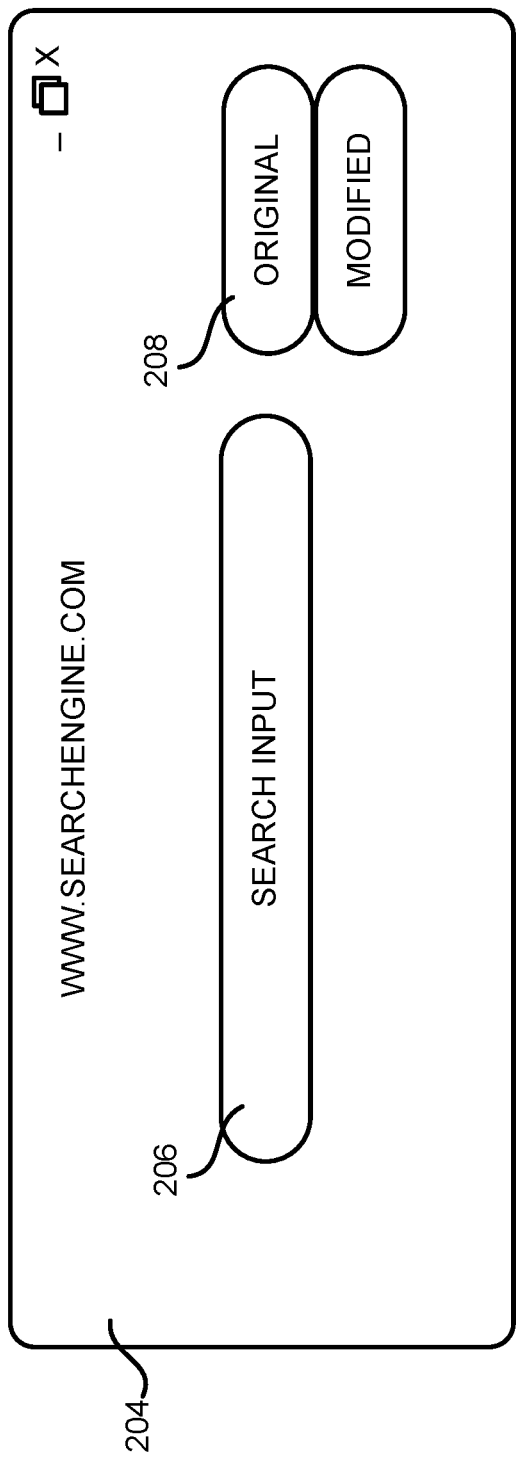
FIGS. 2A-2C are screen diagrams showing an illustrative graphical user interface that is configured with graphical elements for injecting elements into artificial intelligence content.
Figure 2B:
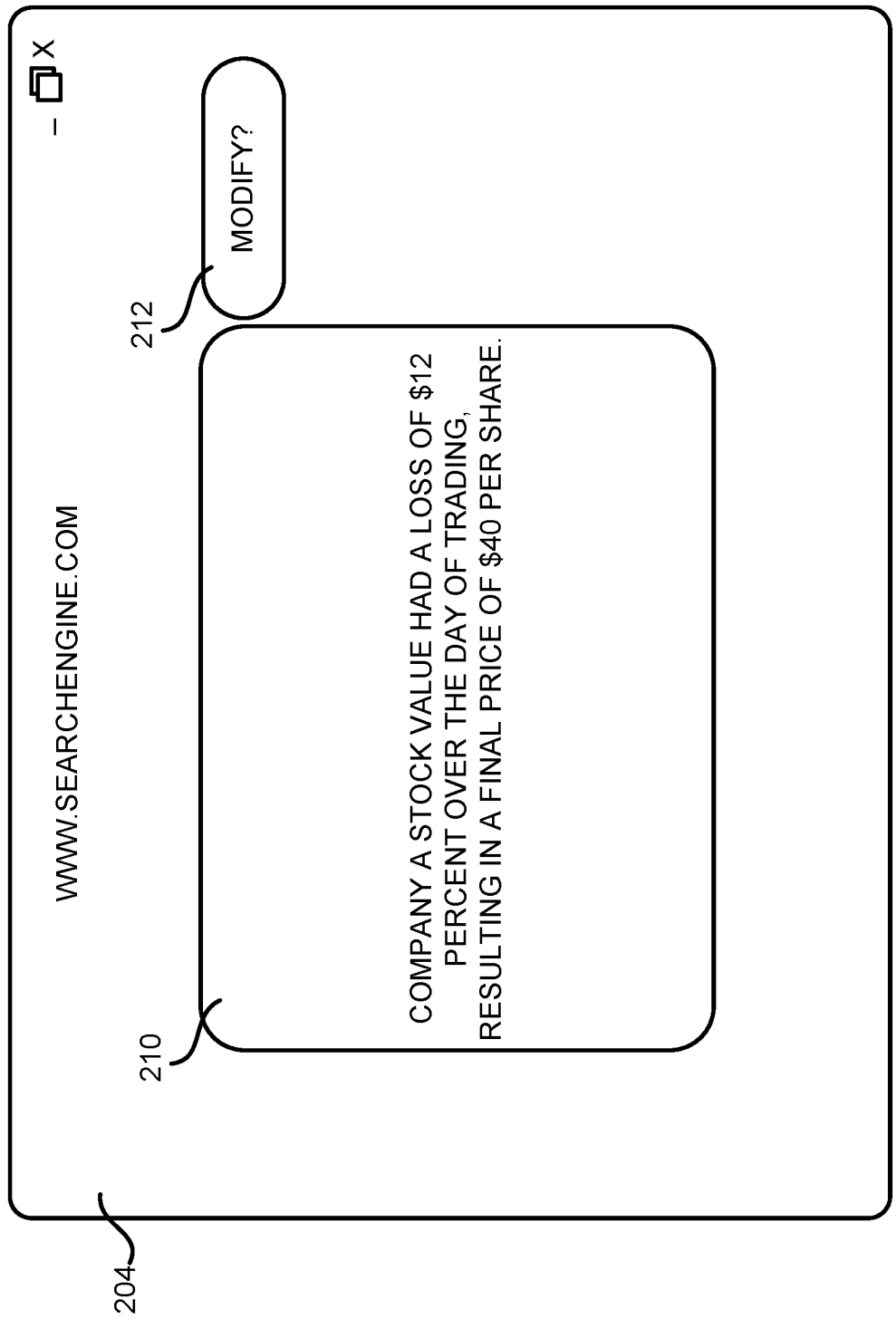
Figure 2C:
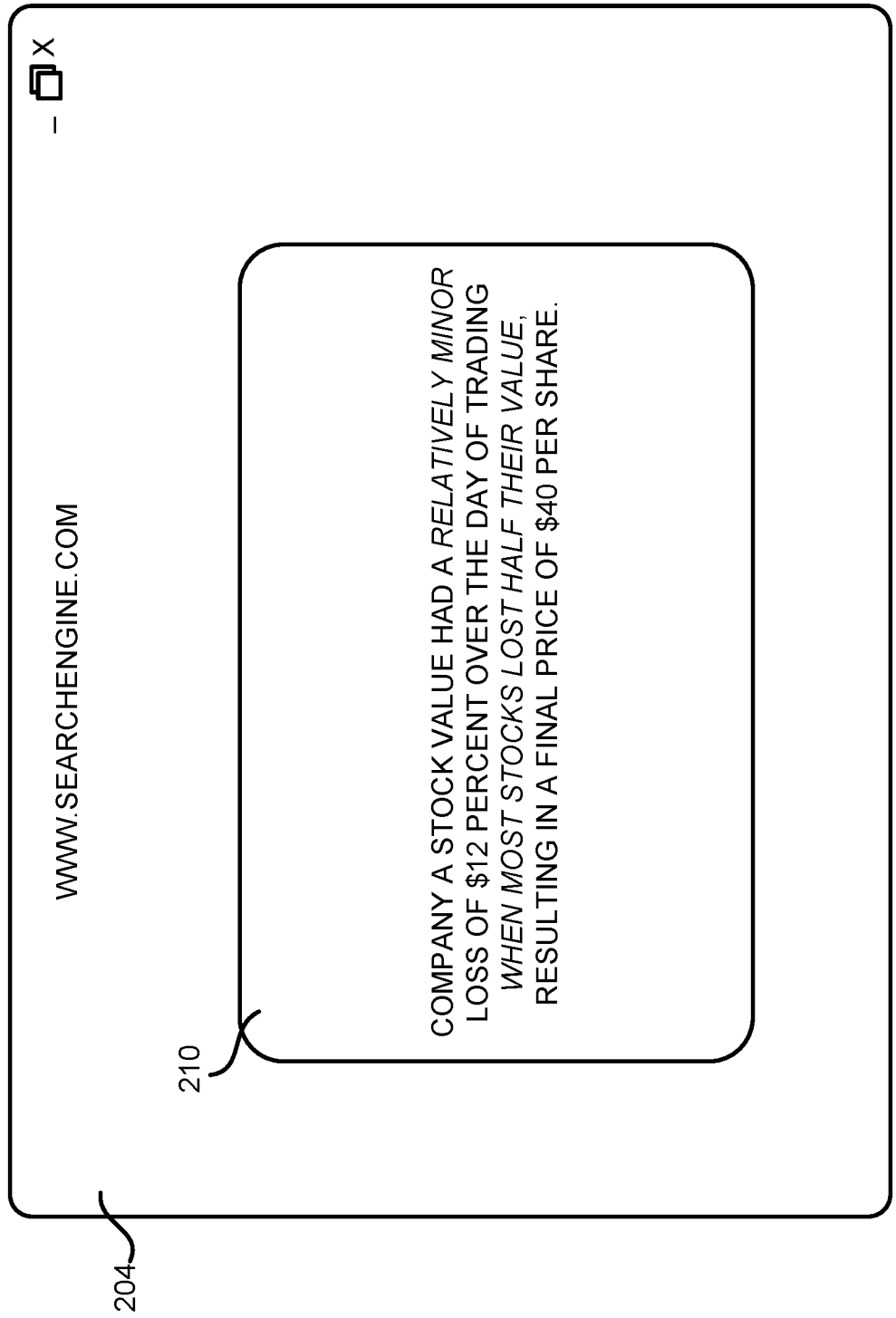

FIGS. 2A-2C are screen diagrams showing the injection system 100 in use. In FIG. 2A, a search interface 204 displayed on the user device 106 is used in an Internet browser to access artificial intelligence content. The search interface 204 includes a search input 206. The search input 206 may be one or more terms, a filter, or other manner in which a user may initiate a search for content, including AI content. In some examples, a user may specifically request content generated by an artificial intelligence source, or the content generated by an artificial intelligence source may be provided without the knowledge of a user (or other system or entity).

The search interface 204 includes a content selection input 208. The content selection input 208 receives a selection to return as a result of the search either "Original" content or "Modified" content. As used herein, original content is the AI content 112 generated by one or more AI creators 110. As used herein, modified content is the modified AI content 126. It should be noted, however, that the presently disclosed subject matter does not require the use of a content selection input 208, as results may be automatically modified.

FIG. 2B is the search interface 204 after the AI content 112 is received but unmodified. An example of AI content 112 is provided in FIG. 2B in as a result 210. The result 210 is from AI content 112 that is content generated by an artificial intelligence source upon analyzing Company A's stock. As with the accident indicated above, while factual, the effect of the loss (a fact) may not be entirely clear in the content. To provide an effect of the loss, the search interface 204 may also include a modification input 212. When selected, the modification input 212 causes the content injector 118 to modify the result 210 to be modified AI content 126.

In the example provided in FIG. 2B, the effect of the loss may appear significant in the original form of the AI content 112. A $12 loss of a stock originally valued at $52, in a vacuum, appears to be significant. However, when the modified input 212 is selected, the content injector 118 may determine, using information retrieved from data stores 103, that the effect is not significant (and may actually be a positive). For example, the data store 103A may be a data store that contains information that the stock market in which Company A's stock is traded had a major freefall, resulting in massive losses across the board.

FIG. 2C is the search interface 204 after the AI content 112 in the result 210 is modified to be modified AI content 126. As shown in FIG. 2C, the words, "relatively minor" and "when most stocks lost half their value" were added to indicate an effect of the loss (one of the facts).

Figure 3:
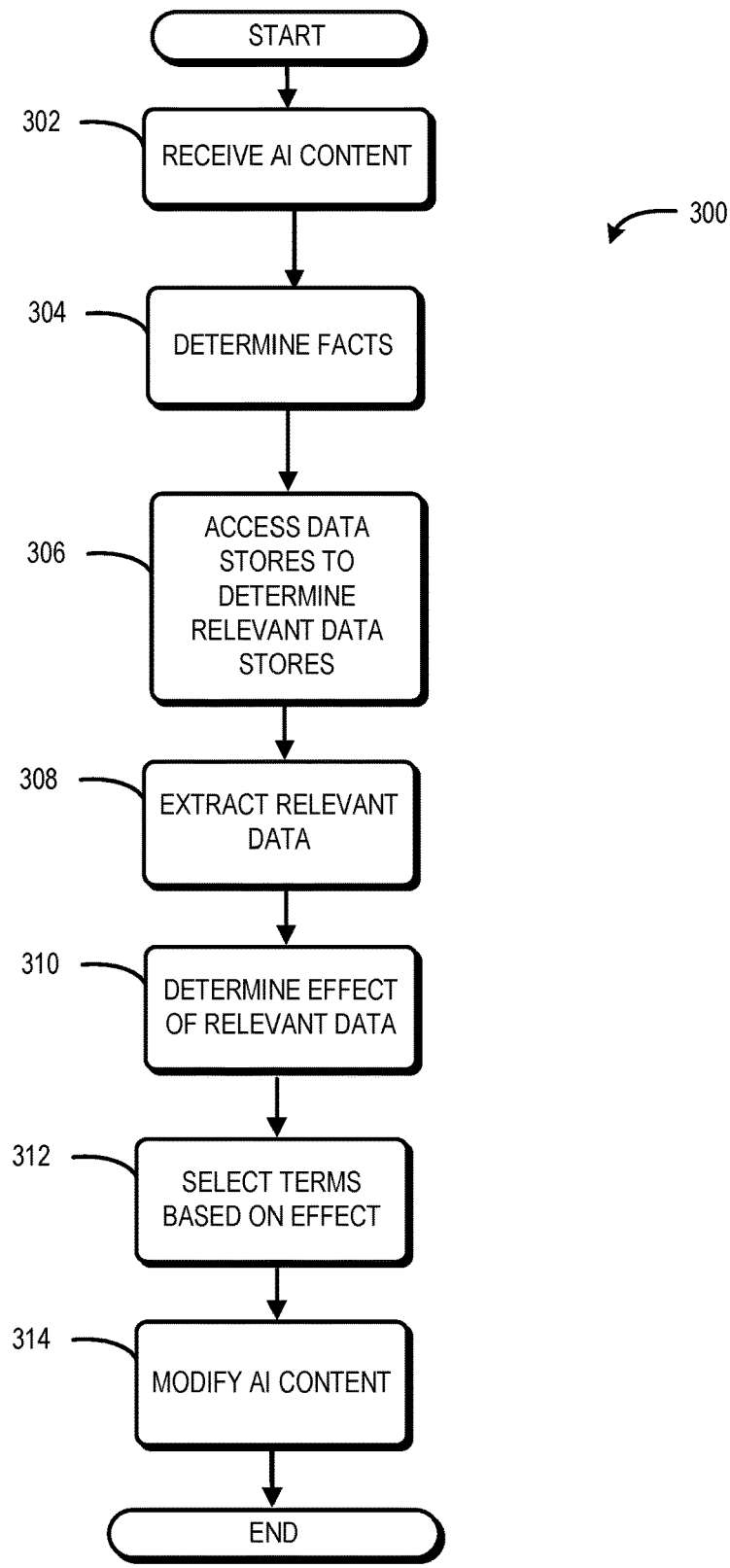
FIG. 3 is a flow diagram showing a routine illustrating aspects of a mechanism disclosed herein for injecting elements into artificial intelligence content

FIG. 3 is a flow diagram showing aspects of a method 300 disclosed herein for injecting elements into artificial intelligence content. It should be understood that the operations of the method 300 are not necessarily presented in any particular order and that performance of some or all of the operations in an alternative order(s) is possible and is contemplated. The operations have been presented in the demonstrated order for ease of description and illustration. Operations can be added, omitted, and/or performed simultaneously, without departing from the scope of the appended claims.

It also should be understood that the illustrated method 300 can be ended at any time and need not be performed in its entirety. Some or all operations of the method 300, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Computer-storage media does not include transitory media.

Thus, it should be appreciated that the logical operations described herein can be implemented as a sequence of computer implemented acts or program modules running on a computing system, and/or as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules can be implemented in software, in firmware, in special purpose digital logic, and any combination thereof.

For purposes of illustrating and describing the technologies of the present disclosure, the method 300 disclosed herein is described as being performed by the server computer 104 via execution of computer executable instructions such as, for example, the content injector 118. As explained above, the content injector 118 can include functionality injecting elements into artificial intelligence content. While the method 300 is described as being provided by the server computer 104, it should be understood that the server computer 104 and/or the source device 102 can provide the functionality described herein via execution of various application program modules and/or elements. Additionally, devices other than, or in addition to, the server computer 104 can be configured to provide the functionality described herein via execution of computer executable instructions other than, or in addition to, the content injector 118. As such, it should be understood that the described configuration is illustrative, and should not be construed as being limiting in any way.

The method 300 begins at operation 302, where the AI content 112 is received. The AI content 112 is content provided by a source using artificial intelligence to generate content. In some examples, the AI content 112 includes, but is not limited to, documents, website information, text generally, and the like.

The method 300 continues to operation 304, where facts are determined from the AI content 112. As discussed above, as used herein, facts are information contained in the story. For example, a fact can be the number of cars in an accident, that an accident occurred, when an accident occurred, where an accident occurred, and the like. In some examples, the determination of one or more facts from the AI content 112 can provide raw information that is used as a basis for injecting content.

The method 300 continues to operation 306, where one or more data stores 103 are accessed and the relevancy of the data stores 103 are determined. The relevancy of the data stores 103 can be based on the facts. For example, in the case of a car accident in Times Square, a data store relating to fish populations in Washington state may be less relevant to the population of humans in Times Square.

The method 300 continues to operation 308, where relevant data is extracted from the data stores 103 that are determined to be relevant. Relevant data may include the population around an event, stock prices of other stocks affecting a story about a particular stock, and the like.

The method 300 continues to operation 310, where an effect is determined from the relevant data obtained at operation 308. An effect may be an impact, potential fallout, or other effect from the facts of the AI content 112. For example, if the population around a car accident is determined to be 5 people, the effect of the car accident may be minimal. On the other hand, if the population around a car accident is several million people, the effect of the car accident may be significant.

The method 300 continues to operation 312, where terms are selected based on the one or more effects determined at operation 310. These terms may be provided in a table, database, or other means. For example, a listing of effects can be provided to one or more humans that list words associated with the effect. The content injector can be trained by presenting modified AI content to human reviewers that examine the modified AI content using the terms, whereby the humans inform the content injector as to whether or not the terms selected are correct. Other means of training the content injector 118 (or the content determination store 122) can be used and are considered to be within the scope of the presently disclosed subject matter.

The method 300 continues to operation 314, where the AI content is modified using the terms determined at operation 312. The method 300 can thereafter end.

The present disclosure also encompasses the subject matter set forth in the following clauses:

Clause 1: computer-implemented method, the method comprising receiving artificial intelligence content generated by an artificial intelligence source, determining at least one fact from the artificial intelligence content, extracting relevant data based on the at least one fact, selecting at least one term using the relevant data; and modifying the artificial intelligence content using the at least one term.

Clause 2. The computer-implemented method of clause 1, wherein extracting relevant data comprises determining at least one data store that is relevant to the at least one fact.

Clause 3. The computer-implemented method of any of clauses 1-2, further comprising receiving a request to modify the artificial intelligence content.

Clause 4. The computer-implemented method of any of clauses 1-3, further comprising receiving a search input to initiate a search for the artificial intelligence content.

Clause 5. The computer-implemented method of any of clauses 1-4, further comprising receiving a search input to initiate a search for the artificial intelligence content.

Clause 6. The computer-implement method of any of clauses 1-5, wherein the search input comprises one or more words.

Clause 7. A computer-readable storage medium having computer-executable instructions stored thereupon that, when executed by a computer, cause the computer to: receive artificial intelligence content generated by an artificial intelligence source; determine at least one fact from the artificial intelligence content; extract relevant data based on the at least one fact; select at least one term using the relevant data; and modify the artificial intelligence content using the at least one term.

Clause 8. The computer-readable storage medium of clause 7, wherein the computer-executable instructions to extract relevant data further comprise computer-executable instructions to determine at least one data store that is relevant to the at least one fact.

Clause 9. The computer-readable storage medium of any of clauses 7-8, further comprising computer-executable instructions to receive a request to modify the artificial intelligence content.

Clause 10. The computer-readable storage medium of any of clauses 7-9, further comprising computer-executable instructions to receive a search input to initiate a search for the artificial intelligence content.

Clause 11. The computer-readable storage medium of any of clauses 7-10, further comprising computer-executable instructions to receive a content selection input to receive the artificial intelligence content in an original form or modified artificial intelligence content as a result of the search.

Clause 12. The computer-readable storage medium of any of clauses 7-11, wherein the search input comprises one or more words.

Clause 13. A system comprising: a processor; and a computer-readable storage medium in communication with the processor, the computer-readable storage medium having computer-executable instructions stored thereupon which, when executed by the processor, cause the processor to receive artificial intelligence content generated by an artificial intelligence source; determine at least one fact from the artificial intelligence content; extract relevant data based on the at least one fact; select at least one term using the relevant data; and modify the artificial intelligence content using the at least one term.

Clause 14. The system of clause 13, wherein the computer-executable instructions to extract relevant data further comprise computer-executable instructions to determine at least one data store that is relevant to the at least one fact.

Clause 15. The system of any of clauses 13-14, further comprising computer-executable instructions to receive a request to modify the artificial intelligence content.

Clause 16. The system of any of clauses 13-15, further comprising computer-executable instructions to receive a search input to initiate a search for the artificial intelligence content.

Clause 17. The system of any of clauses 13-16, further comprising computer-executable instructions to receive a content selection input to receive the artificial intelligence content in an original form or modified artificial intelligence content as a result of the search.

Clause 18. The system of any of clauses 13-17, wherein the search input comprises one or more words.

Figure 4:
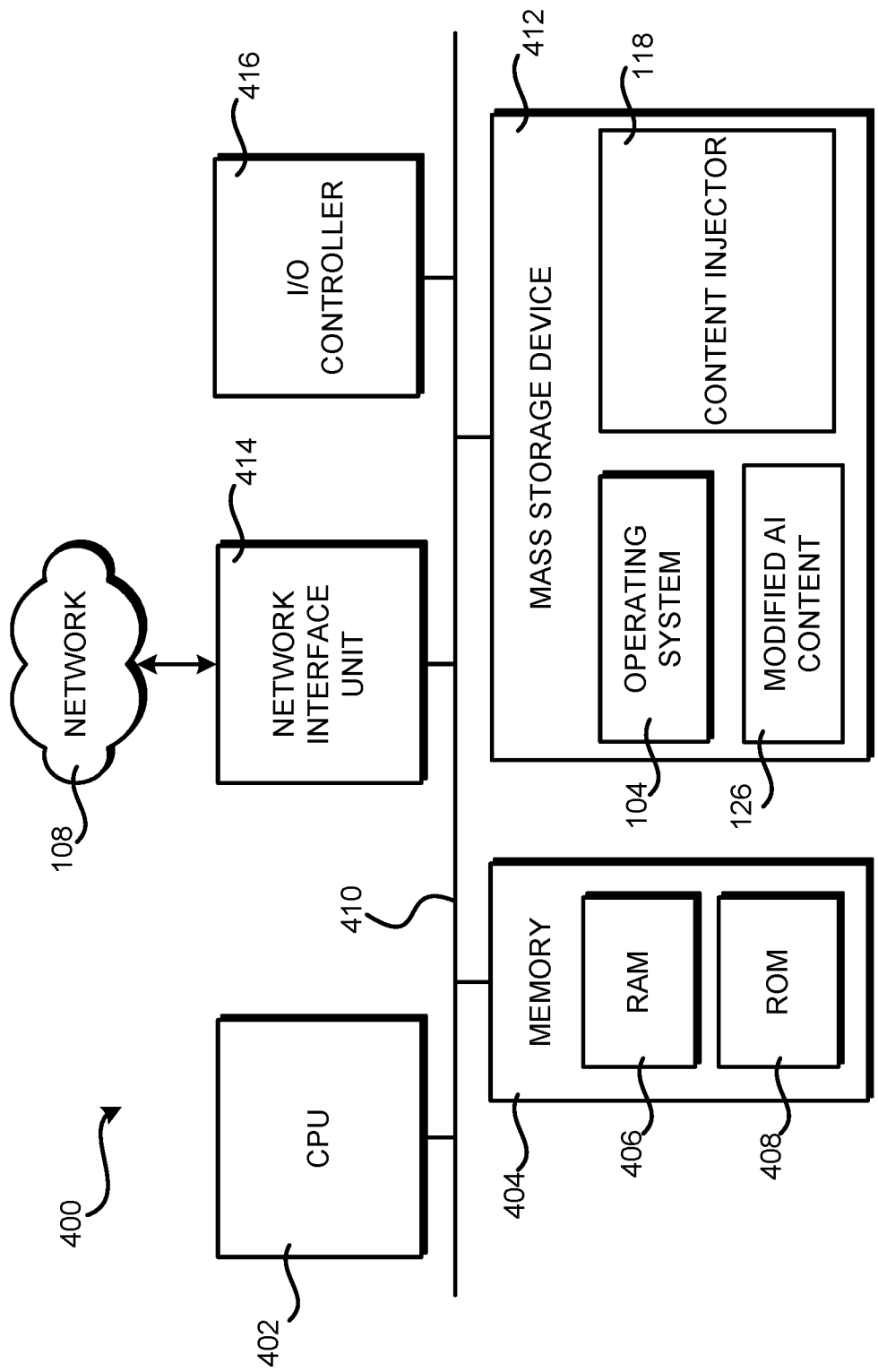
FIG. 4 is a computer architecture diagram illustrating an illustrative computer hardware and software architecture for a computing system capable of implementing the technologies presented herein.

FIG. 4 illustrates an illustrative computer architecture 400 for an artificial intelligence content injection system described herein. Thus, the computer architecture 400 illustrated in FIG. 4 illustrates an architecture for a server computer, mobile phone, a smart phone, a desktop computer, a netbook computer, a tablet computer, and/or a laptop computer. The computer architecture 400 can be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 104 and one or more application programs or data stores including, but not limited to, the content injector 118 and the modified AI content 126.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media can include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes the claims, a "computer storage medium" or "computer-readable storage medium," and variations thereof, do not include waves, signals, and/or other transitory and/or intangible communication media, per se. For the purposes of the claims, "computer-readable storage medium," and variations thereof, refers to one or more types of articles of manufacture.

According to various configurations, the computer architecture 400 can operate in a networked environment using logical connections to remote computers through a network such as the network 108. The computer architecture 400 can connect to the network 108 through a network interface unit 414 connected to the bus 410. It should be appreciated that the network interface unit 414 can also be utilized to connect to other types of networks and remote computer systems. The computer architecture 400 can also include an input/output controller 416 for receiving and processing input from a number of other devices, including a keyboard, mouse, or electronic stylus (not shown in FIG. 4). Similarly, the input/output controller 416 can provide output to a display screen, a printer, or other type of output device (also not shown in FIG. 4).

It should be appreciated that the software components described herein can, when loaded into the CPU 402 and executed, transform the CPU 402 and the overall computer architecture 400 from a general-purpose computing system into a special-purpose computing system customized to facilitate the functionality presented herein. The CPU 402 can be constructed from any number of transistors or other discrete circuit elements, which can individually or collectively assume any number of states. More specifically, the CPU 402 can operate as a finite-state machine, in response to executable instructions contained within the software modules disclosed herein. These computer-executable instructions can transform the CPU 402 by specifying how the CPU 402 transitions between states, thereby transforming the transistors or other discrete hardware elements constituting the CPU 402.

Encoding the software modules presented herein can also transform the physical structure of the computer-readable media presented herein. The specific transformation of physical structure can depend on various factors, in different implementations of this description. Examples of such factors can include, but are not limited to, the technology used to implement the computer-readable media, whether the computer-readable media is characterized as primary or secondary storage, and the like. For example, if the computer-readable media is implemented as semiconductor-based memory, the software disclosed herein can be encoded on the computer-readable media by transforming the physical state of the semiconductor memory. For example, the software can transform the state of transistors, capacitors, or other discrete circuit elements constituting the semiconductor memory. The software also can transform the physical state of such components in order to store data thereupon.

As another example, the computer-readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 can include other types of computing devices, including hand-held computers, embedded computer systems, personal digital assistants, and other types of computing devices known to those skilled in the art. It is also contemplated that the computer architecture 400 might not include all of the components shown in FIG. 4, can include other components that are not explicitly shown in FIG. 4, or might utilize an architecture completely different than that shown in FIG. 4.

Based on the foregoing, it should be appreciated that technologies for injecting elements into artificial intelligence content have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes can be made to the subject matter described herein without following the example configurations and applications illustrated and described, and without departing from the true spirit and scope of the present invention, aspects of which are set forth in the following claims.

What is claimed is:

1. A computer-implemented method used in an Internet browser to search for artificial intelligence content, the method comprising:
   receiving artificial intelligence content generated autonomously by an artificial intelligence source;
   providing a content selection input in a user interface, the content selection input configured to receive an input from a user to cause the artificial intelligence content to be provided as original content or to be modified;
   upon receiving the input to cause the artificial intelligence content to be provided as original content, providing the artificial intelligence content; and
   upon receiving the input to modify the artificial intelligence content:
      determining at least one fact from the artificial intelligence content;
      extracting relevant data based on the at least one fact;
      determining an effect of the relevant data;
      selecting at least one term using the relevant data based on the effect; and
      modifying the artificial intelligence content using the at least one term.

2. The computer-implemented method of claim 1, wherein extracting relevant data comprises determining at least one data store that is relevant to the at least one fact.

3. The computer-implemented method of claim 1, further comprising receiving a request to modify the artificial intelligence content.

4. The computer-implemented method of claim 1, further comprising receiving a search input to initiate a search for the artificial intelligence content.

5. The computer-implement method of claim 4, wherein the search input comprises one or more words.

6. A non-transitory computer-readable storage medium having computer-executable instructions stored thereupon that, when executed by a computer, cause the computer to:
   receive artificial intelligence content as a result of search operation, the artificial intelligence content generated autonomously by an artificial intelligence source;
   provide a content selection input in a user interface, the content selection input configured to receive an input from a user to cause the artificial intelligence content to be provided as original content or to be modified;
   upon receiving the input to cause the artificial intelligence content to be provided as original content, provide the artificial intelligence content; and
   upon receiving the input to modify the artificial intelligence content:
      determine at least one fact from the artificial intelligence content;
      extract relevant data based on the at least one fact;
      determine an effect of the relevant data;
      select at least one term using the relevant data based on the effect; and
      modify the artificial intelligence content using the at least one term.

7. The non-transitory computer-readable storage medium of claim 6, wherein the computer-executable instructions to extract relevant data further comprise computer-executable instructions to determine at least one data store that is relevant to the at least one fact.

8. The non-transitory computer-readable storage medium of claim 6, further comprising computer-executable instructions to receive a request to modify the artificial intelligence content.

9. The non-transitory computer-readable storage medium of claim 6, further comprising computer-executable instructions to receive a search input to initiate a search for the artificial intelligence content.

10. The non-transitory computer-readable storage medium of claim 9, further comprising computer-executable instructions to receive a content selection input to receive the artificial intelligence content in an original form or modified artificial intelligence content as a result of the search.

11. The non-transitory computer-readable storage medium of claim 9, wherein the search input comprises one or more words.

12. A system to search for artificial intelligence content comprising:
   a processor; and
   a computer-readable storage medium in communication with the processor, the computer-readable storage medium having computer-executable instructions stored thereupon which, when executed by the processor, cause the processor to receive artificial intelligence content generated autonomously by an artificial intelligence source;

provide a content selection input in a user interface, the content selection input configured to receive an input from a user to cause the artificial intelligence content to be provided as original content or to be modified;

upon receiving the input to cause the artificial intelligence content to be provided as original content, provide the artificial intelligence content; and upon receiving the input to modify the artificial intelligence content:
   determine at least one fact from the artificial intelligence content;
   extract relevant data based on the at least one fact;
   determine an effect of the relevant data;
   select at least one term using the relevant data based on the effect; and
   modify the artificial intelligence content using the at least one term.

13. The system of claim 12, wherein the computer-executable instructions to extract relevant data further comprise computer-executable instructions to determine at least one data store that is relevant to the at least one fact.

14. The system of claim 12, further comprising computer-executable instructions to receive a request to modify the artificial intelligence content.

15. The system of claim 12, further comprising computer-executable instructions to receive a search input to initiate a search for the artificial intelligence content.

16. The system of claim 15, further comprising computer-executable instructions to receive a content selection input to receive the artificial intelligence content in an original form or modified artificial intelligence content as a result of the search.

17. The system of claim 15, wherein the search input comprises one or more words.

* * * * *